United States Patent [19]
Pierson

[11] Patent Number: 5,808,710
[45] Date of Patent: Sep. 15, 1998

[54] LIQUID CRYSTAL DISPLAY TILE INTERCONNECT STRUCTURE

[75] Inventor: Mark Vincent Pierson, Binghamton, N.Y.

[73] Assignee: International Business Machines Corporation, Armonk, N.Y.

[21] Appl. No.: 835,196

[22] Filed: Apr. 7, 1997

[51] Int. Cl.[6] .................. G02F 1/1333; G02F 1/1345
[52] U.S. Cl. ................................. 349/73; 349/149
[58] Field of Search .................... 349/73, 149, 151, 349/152, 74; 445/24; 439/74, 66, 78, 84

[56] References Cited

U.S. PATENT DOCUMENTS

| | | | |
|---|---|---|---|
| 3,861,783 | 1/1975 | Dill et al. | 349/73 |
| 3,912,153 | 10/1975 | Hartleroad et al. | 228/254 |
| 4,295,596 | 10/1981 | Doten et al. | 228/180 |
| 4,408,836 | 10/1983 | Kikuno | 350/334 |
| 4,564,135 | 1/1986 | Barresi et al. | 228/6.2 |
| 4,789,096 | 12/1988 | Dunn et al. | 228/179 |
| 4,832,457 | 5/1989 | Saitoh et al. | 349/73 |
| 5,106,197 | 4/1992 | Ohuchida et al. | 349/73 |
| 5,563,470 | 10/1996 | Li | 445/24 |

FOREIGN PATENT DOCUMENTS 56-121014 (A) 9/1981 Japan .............. G02F 1/133

*Primary Examiner*—Anita Pellman Gross
*Assistant Examiner*—Tai V. Duong
*Attorney, Agent, or Firm*—Pollock, Vande Sande & Priddy

[57] ABSTRACT

Adjacent liquid crystal display tiles are internally electrically interconnected, thereby providing wire escapes for the pixels of the tiles.

21 Claims, 7 Drawing Sheets

LIQUID CRYSTAL DISPLAY TILE INTERCONNECT STRUCTURE

TECHNICAL FIELD

The present invention is concerned with electrically interconnecting individual liquid crystal display tiles to adjacent or juxtaposed tiles. In particular, the present invention is concerned with a relatively inexpensive, simple wiring interconnection from tile-to-tile that does not result in limiting the size of the desired display. The present invention is especially concerned with interconnecting adjacent tiles by internal tile-to-tile interconnects for running both vertical and horizontal pixel wiring.

BACKGROUND OF THE INVENTION

Liquid crystal displays (LCDs) are used extensively as monitors for numerous computer applications. Generally, liquid crystal displays are an assembly comprising a glass panel unit (which is a thin film transistor matrix controlling a liquid crystal emulsion contained between glass plate electrodes); driver electronics which provide the control signals to the thin film transistor matrix, and a lighting unit placed beneath the glass panel unit for illuminating the liquid crystal display panel. The glass panel unit includes a transparent glass substrate upon which the thin film transistor matrix or pixel is placed (the LCD or panel substrate), a second conducting transparent glass plate placed a small distance from and parallel to the panel substrate, filled-in between with the liquid crystal material, and sealed around the edges. The second glass panel is also prepared as a electrode to establish a capacitive connection with the individual transistors or pixels in the thin film transistor matrix on the panel substrate. The entire assembly is housed by a frame and usually has the driver assemblies attached to the frame near the front surface of the panel substrate which contains the thin film transistor array. The liquid crystal material is subjected to electric fields set up between the transistors and the thin film transistor and the cover glass transparent electrode.

Increasing the size of LCDs is continuously being demanded by industry, especially without investing in major retooling. One method used to fabricate larger displays is referred to as tiling. In tiling, conventional size (e.g., 3"×3" or 4"×4") LCD tiles are arranged in a matrix. Typically, the driver chips are interconnected to the LCD either directly on the parameter of the display or to flexible tape which is then interconnected to the edge of the LCD.

The individual LCD tiles are arranged in a matrix and secured to a tile carrier. A black matrix material may also be used on this layer to make the screen look uniform and help hide the tile-to-tile seams. A preferred material is PSR 4000 which is opaque at reasonable thicknesses of about 1 to about 3 mils. The cover plate of the tile carrier like the back plate of the tile carrier should contain a black matrix layer to define the pixels and hide the seams or may contain any of the various commercially available coatings to improve view angle and/or screen brightness.

In the tiling method, edges of an individual LCD tile may be internal to the overall matrix edge. However, these internal edges must also be electrically connected to the driver chips. Currently, these interconnections are made by wire bonding, flex circuits or conductive adhesives. However, these methods pose serious limitations on the minimal spacing that can be achieved between individual tile elements in the matrix. The spacing between tiles represents a critical parameter that must be controlled in order to present a "seamless" look generated by the tiled LCD.

Accordingly, the desire to move tiles closer together as performance and resolution are continuously being improved while the electronics is becoming smaller. Therefore, improved techniques for electrically interconnecting the LCD tiles to achieve the necessary wiring escape without utilizing valuable real estate would be desirable.

SUMMARY OF INVENTION

The present invention provides a relatively inexpensive and simple wiring interconnection that makes possible displays exhibiting increased viewing area. The present invention provides for the wiring escape for internal tiles.

More particularly, the present invention is concerned with a liquid crystal flat panel display that comprises a plurality of liquid crystal display tiles arranged in a matrix and secured to a tile carrier. Each of the liquid crystal display tiles includes a top panel and a substantially parallel bottom panel. A circuit path is located on at least one major external surface of the liquid crystal display tile. In addition, metallization present on at least one sidewall edge of the at least one major external surface containing the circuit path.

As used herein, the term "major external surface of the crystal display tile," refers to the top major surface of the top panel or the bottom major surface of the bottom panel of the liquid crystal display tile. Each adjacent tile is electrically interconnected to an adjacent or juxtaposed tile by electrical connection and interconnects the metallization on the opposing sidewall edges of adjacent tiles.

Other objects and advantages of the present invention will become readily apparent to those skilled in this art from the following detailed description, wherein it shown and described only the preferred embodiments of the invention, simply by way of illustration of the best mode contemplated of carrying out the invention. As will be realized, the invention is capable of other and different embodiments, and its several details are capable of modifications in various obvious respects, without departing from the invention. Accordingly, the drawings and description are to be regarded as illustrative in nature and not as restrictive.

SUMMARY OF DRAWINGS

FIG. 4(*a*) is a top view of FIG. 4.

FIG. 5(*b*) is a side view of the interconnection of FIG. 5(*a*).

DESCRIPTION OF BEST AND VARIOUS EMBODIMENTS FOR CARRYING OUT INVENTION

In order to facilitate an understanding of the present invention, reference will be made to the figures, wherein like numbers in different views represent the same components. Also, although the examples below illustrate interconnection between tiles wherein the top major surface of the top panel contains a circuit path, it is understood that the invention is applicable for tile arrangements containing a circuit path on its bottom major surface of the bottom panel.

Figure 1:
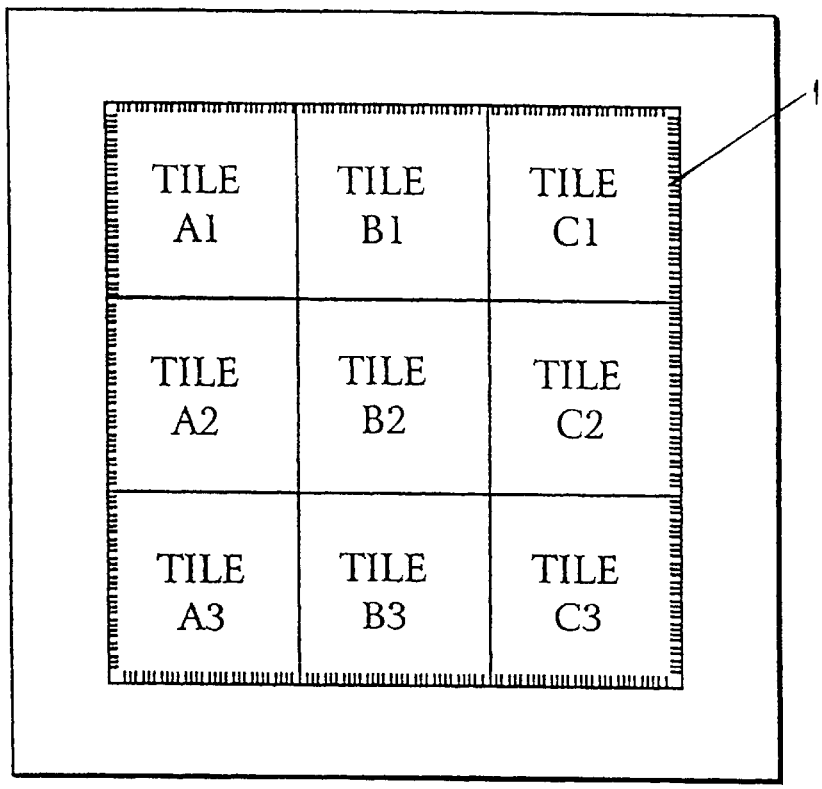
FIG. 1 is a top view of a 3×3 tile matrix.

FIG. 1 illustrates a representative of liquid crystal display tile matrix containing 3×3 tiles. The wiring escapes from the tile 1 are placed on the parameter of the tiles. However, as illustrated, the wiring escapes needed for tile B2, in the center of the 3×3 matrix cannot be carried out in the same manner as the other tiles.

Figure 2:
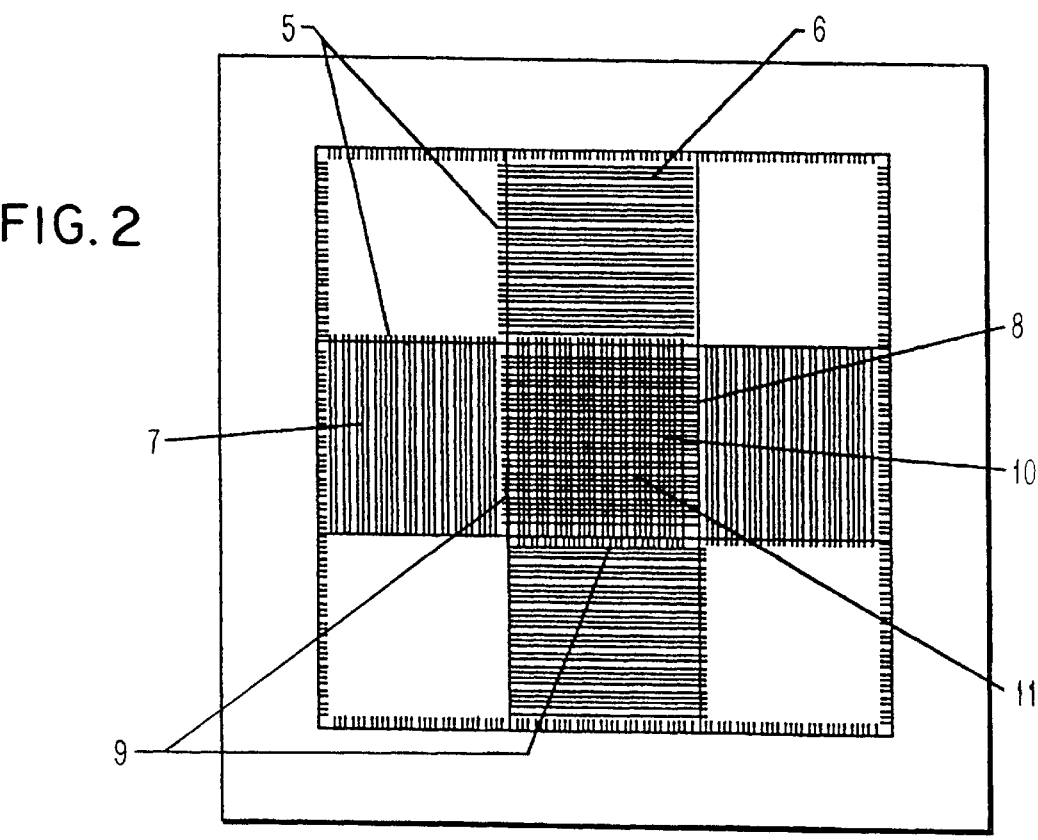
FIG. 2 is a top view illustrating tile-to-tile connections in a tile matrix.

FIG. 2 illustrates making tile-to-tile interconnections 5 thereby providing pixel wiring escapes for both the horizontal 6 address lines and the vertical 7 address lines, which in turn extend to the parameter of the tile display. In this manner, even the internal center tile 8 can be connected to adjacent tile wiring by internal tile-to-tile interconnections to run both the vertical 10 pixel wiring and the horizontal 11 pixel wiring. As will be apparent, employing this technique, any number of tiles can be interconnected rendering the viewing area virtually limitless.

Figure 3:
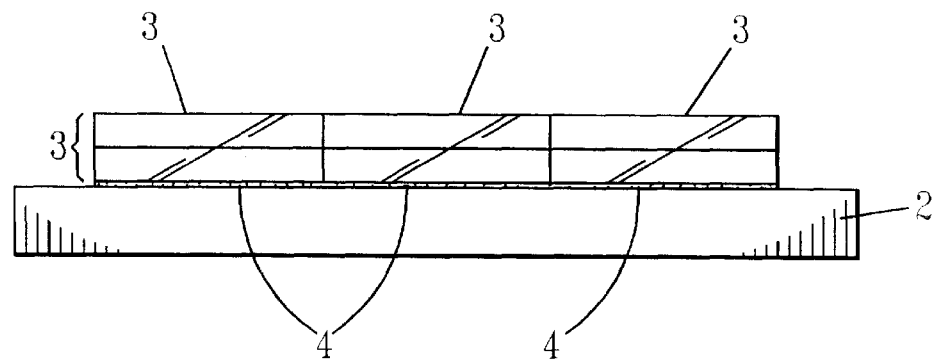
FIG. 3 is a side view of connection of tiles to underlying bottom plate of the tile carrier.

In FIG. 3, tiles 3 are located in juxtaposed substantially co-planar relationship and attached or secured to bottom plate of the tile carrier 2, for instance by an adhesive 4. The adhesive is typically a transparent adhesive material, such as an epoxy, urethanes, acrylates or silicone. Typical preferred adhesives for this purpose are high performance optically clear silicone adhesives available from Dow Corning HIPEC 649 and HIPEC X3-6930. In the alternative, the tiles 3 can be secured to the bottom plate 2 of the tile carrier by solder or adhesive that is not optically clear. In this instance, the adhesive or solder would be necessarily placed in the black spaces between pixels, so as not to interfere with the display.

Figure 4:
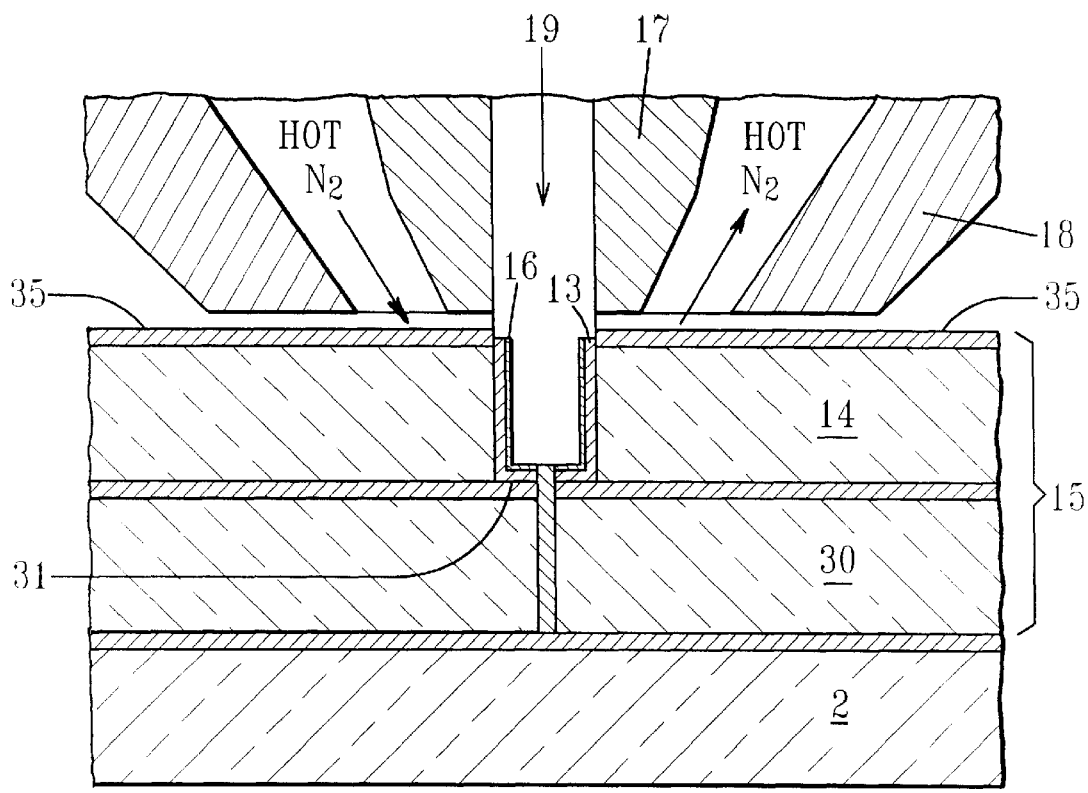
FIG. 4 is a schematic of a cross-section of two adjacent tiles requiring interconnection.
Figure 4A:
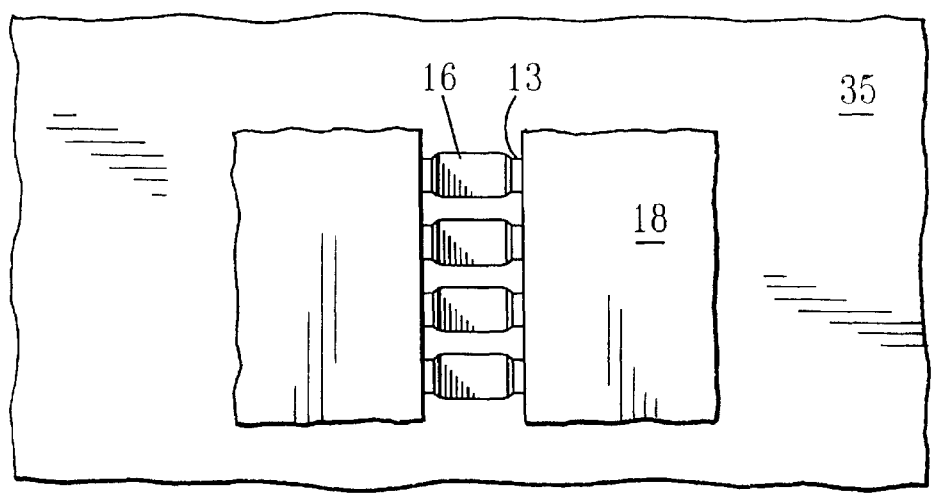

FIG. 4 illustrates two adjacent tiles 15 that include a top plate 14 and bottom plate 30. A small ledge or conductor pad portion 31 is provided on the top major surface of the lower plate of the liquid crystal display tile. This is typically about 50,000 to about 100,000 angstroms. Metallization is provided on this ledge as well as providing circuit path 35 on the top major surface of the top plate 14 of the liquid crystal display tile. An "L" shaped metallization land 13 is provided on the small ledge of the adjacent tiles, and on the sidewall edge of the adjacent tiles. This metallization can be provided by evaporization or sputtering on the surface of the tiles where needed. Typically the metals are a chrome/copper. The chrome is typically about 50 to about 250 angstroms thick, and the copper is about 50,000 to about 100,000 angstroms thick. Well known methods for providing copper/chrome metallization by evaporation or sputtering are well known and need not be described here in any detail. The tiles in turn can be electrically interconnected by applying a relatively low melting point solder between adjacent metallization on adjacent tiles. Typical low melting point solder has melting points of about 120° C. or below, and include Sn48In52 eutectic. The solder interconnection 16 between the adjacent "L" shaped lands on the adjacent liquid crystal display tile can be carried out by using a small injection needle 17 with a hot nitrogen preheat shroud 18. The needle and shroud can be lowered to close proximity of the top of the tile, then hot inert gas, such as nitrogen, can be used to start the preheat. When the necessary bonding areas have been raised to the needed elevated temperature, pressure would then be applied to the molten solder 19 to force it out of the needle to the metallized copper pads and lands 13. The shroud and needle can be programmed to move at a predetermined rate in order to interconnect all of the adjacent metallized "L" shaped lands 13 as illustrated in FIG. 4(a).

Figure 5A:
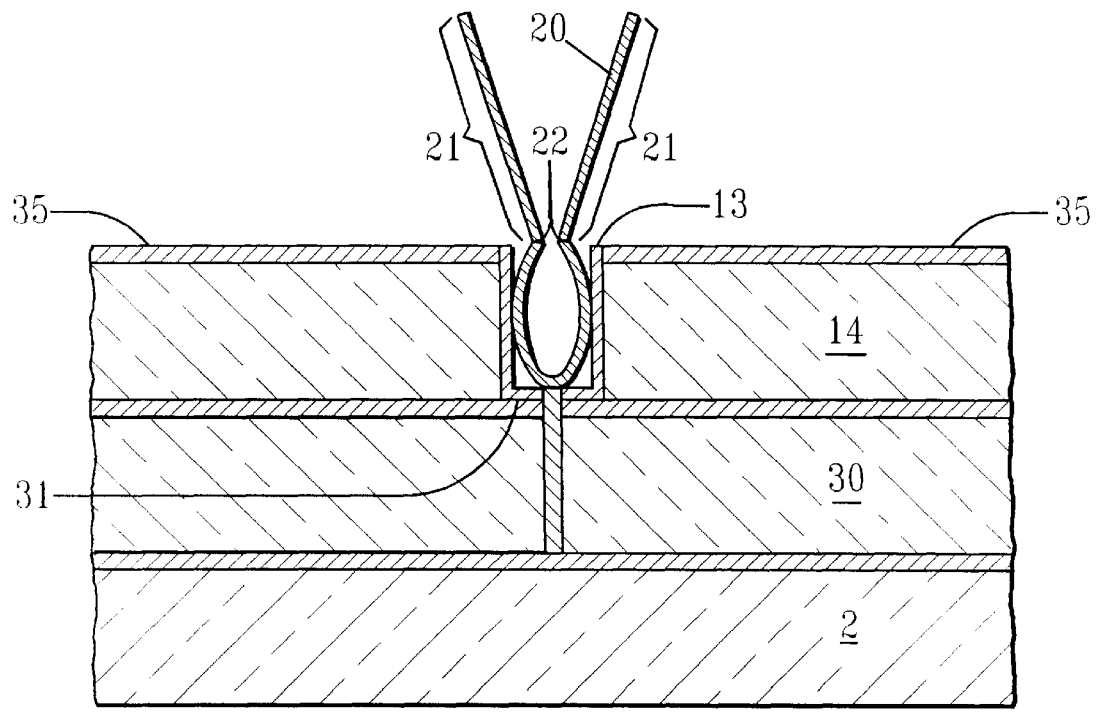
FIG. 5(*a*) is a cross section view of an alternative technique for internally interconnecting adjacent tiles.

FIG. 5a illustrates an alternative way to carry out the electrical interconnection between adjacent tiles. In this technique, a "U" shaped pre-formed electrically conductive spring 20 having a coating of a precious conductive metal such as platinum or palladium at least on its outside surface, thereby providing the electrical interconnection between the "L" shaped lands 13 of adjacent liquid crystal display tiles. The metallization providing the "L" shaped land on the tile preferably would be chrome with an outer layer of gold or palladium. The spring can be placed between the adjacent tiles by collapsing the spring and locating it between adjacent tiles by a tool, and then releasing the "U" shaped pre-formed spring once located between the adjacent tiles. The top portions 21 of the spring can then be bent downward towards the tile and severed from individual "U" shaped connectors by a score mark 22 on the inside of the "U" shaped preformed spring 20.

Figure 6:
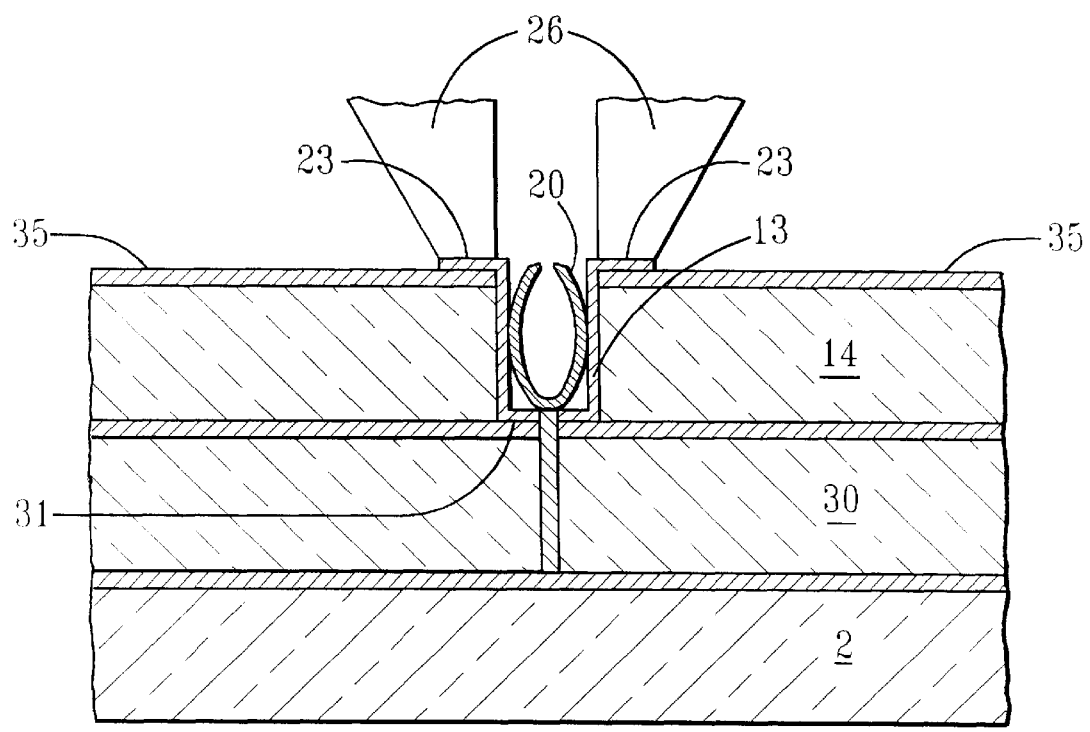
FIG. 6 is a further embodiment for providing an interconnection for adjacent tiles to each other.
Figure 5B:
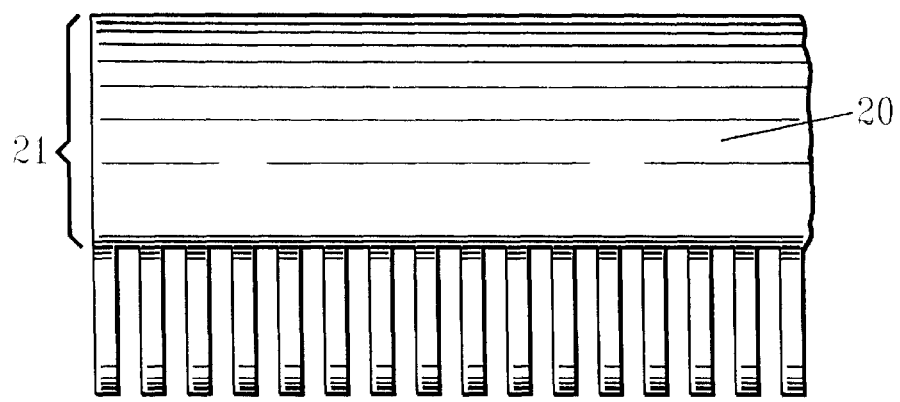

FIG. 6 represents a still further way in which to carry out the interconnection between juxtaposed liquid crystal display tiles. FIG. 6 illustrates providing a "U" shaped pre-formed spring 20 between adjacent tiles and being provided there in much the same manner as discussed above for FIG. 5. However, the "U" shaped pre-formed spring would not be pre-coated with a precious metal as is the spring illustrated in FIG. 5. The conductor spring would then be coated with a thin layer of low melting point solder on its outside surface. The "L" shaped land in this case would be a chrome/copper metallization along the lines of that described in FIG. 4. In this embodiment, after the individual connectors have been placed and severed, the welding tips 26 would be lowered on top of the metallized surfaces 23. The current could then be energized between the weld tips and solder would melt between the spring and chrome/copper metallization, thereby providing the necessary interconnection.

Figure 7:
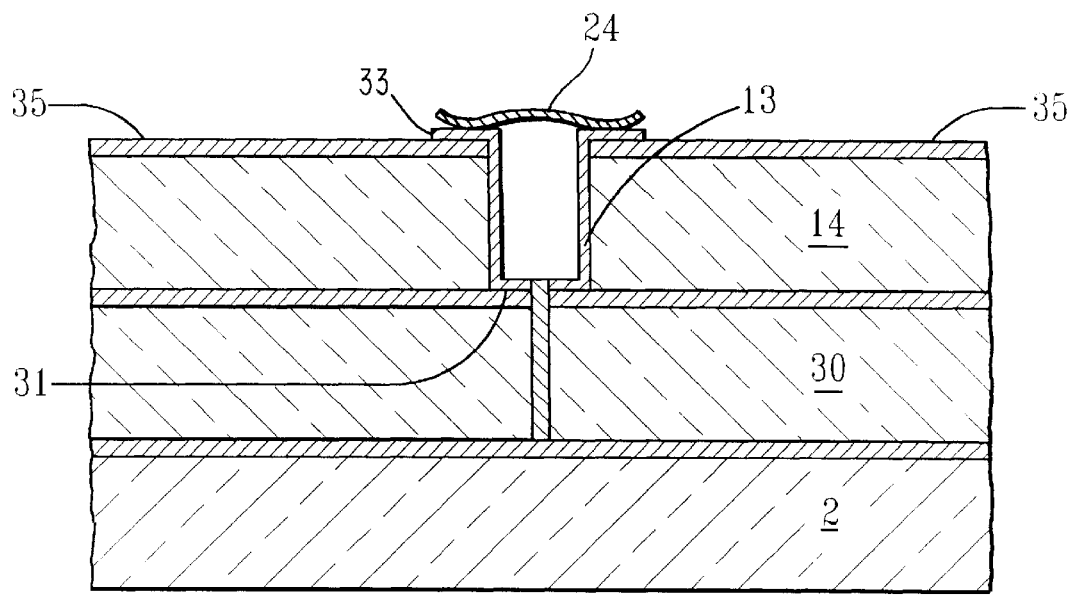
FIG. 7 is still a further embodiment of an electrical interconnection between adjacent tiles.

FIG. 7 illustrates a still further method for interconnecting adjacent tiles whereby in addition to metallizing the ledge 31 and sidewall edges of adjacent tiles, metallization pads 33 are provided on the top surface of the top panel of the liquid crystal display tile. Suitable materials include chrome/aluminum, chrome/gold or chrome/copper. The adjacent tiles are then interconnected by attaching wire bonding or ribbon wire 24 on the metallized pads 33.

The wire or ribbon 24 is typically gold, aluminum or copper.

Figure 9:
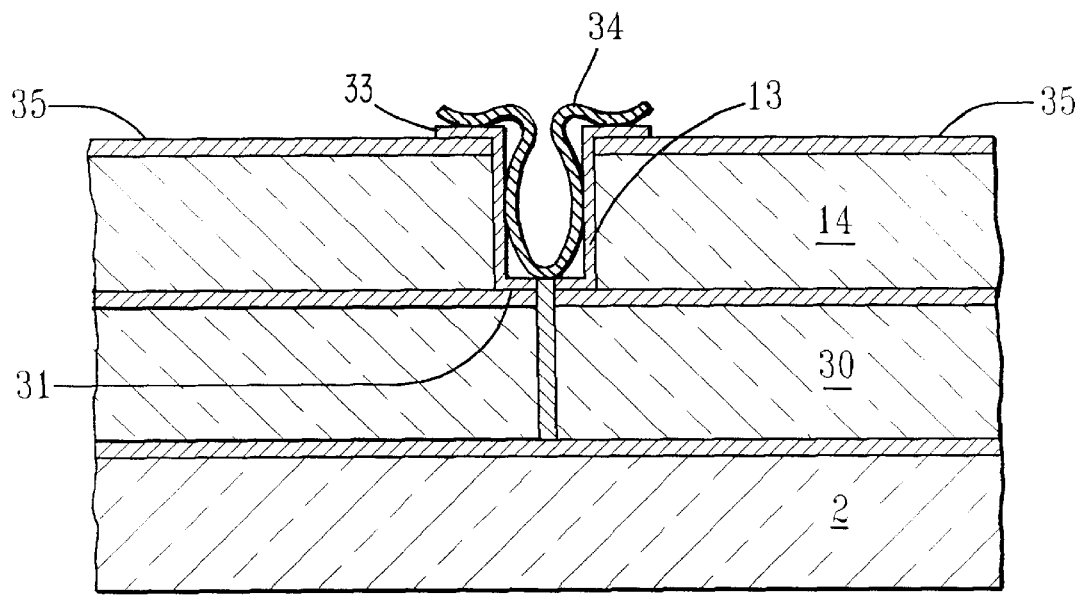
FIG. 9 is another embodiment of an electrical interconnection between adjacent tiles.

FIG. 9 illustrates another embodiment similar to that of FIG. 7 for interconnecting adjacent tiles whereby in addition to metallizing the ledge 31 and sidewall edges 13 of adjacent tiles, metallization pads 33 are provided on the top surface of the top panel of the liquid crystal display tile. Suitable materials include chrome/aluminum, chrome/copper or chrome/gold. The adjacent tiles are then interconnection by attaching wire bonding or ribbon wire 34 on the metallized pads 33. The wire or ribbon 34 is also placed within the clearance between the sidewall edges 13 of adjacent tilers. The wire or ribbon 24 is typically gold, aluminum or copper.

Figure 8:
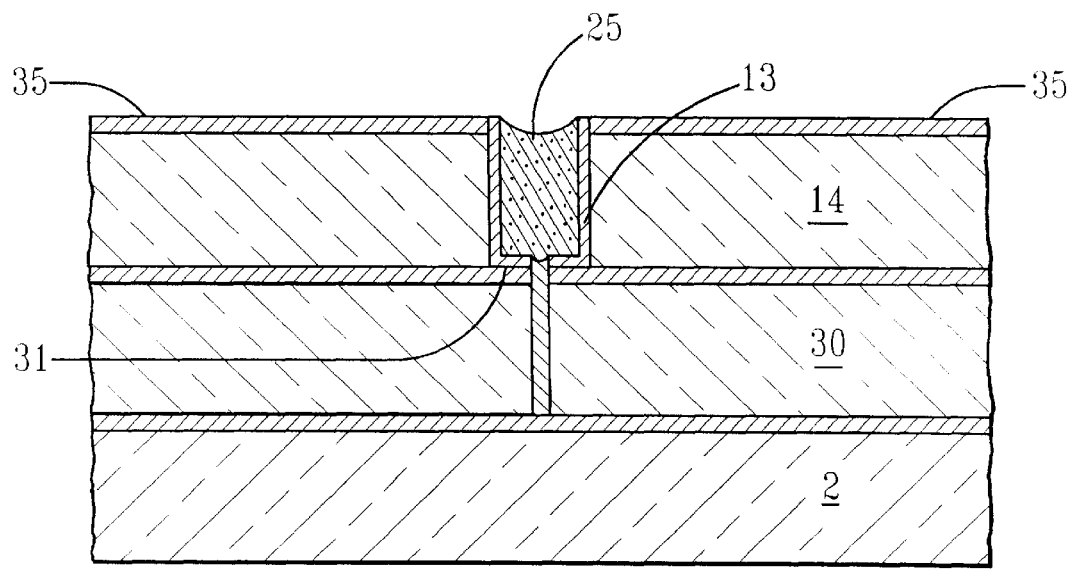
FIG. 8 is a further embodiment of an electrical interconnection between adjacent tiles.

In another embodiment of the present invention (see FIG. 8), the internal tile-to-tile interconnection is made by providing an electrically conductive adhesive 25 that interconnects the "L" shaped land on adjacent tiles. The electrically conductive adhesive includes Ablestick 8175. These adhesives are thermosetting and can be dispensed by employing a dispense needle, or squeegee blade with a stencil followed by curing using elevated temperatures of about 120° C. at two hour bake.

Figure 10:
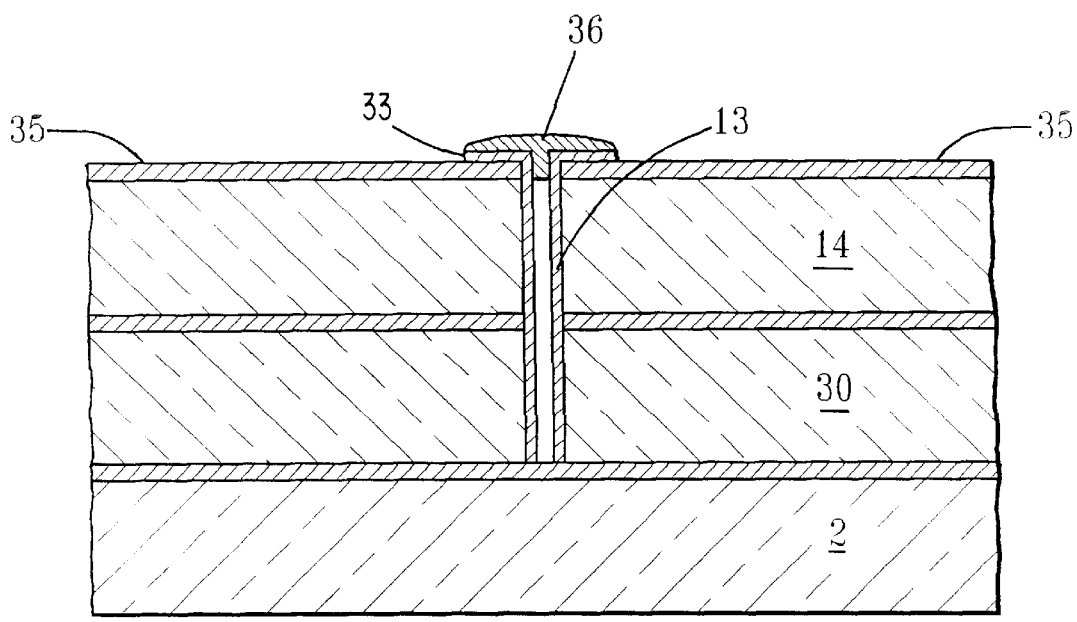
FIG. 10 is a further embodiment of an electrical interconnection between adjacent tiles.
Figure 11:
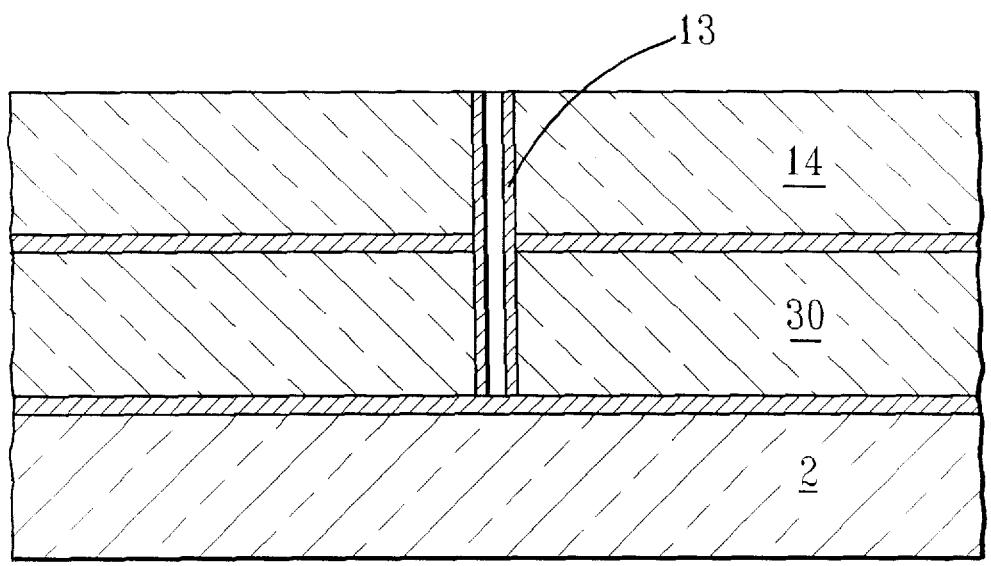
FIG. 11 is a partial view of another embodiment of an electrical interconnection between adjacent tiles.

FIGS. 10 and 11 illustrate embodiments wherein the electrical interconnection employs tiles whereby there is no uncovered ledge pad on a major internal surface of the tile. In FIG. 10, metallization 13 is provided on the sidewall edges of the adjacent tiles and metallization 33 provides for metallization pads on the top panel 14 of each liquid crystal tiles. If desired, the metallization 13 need only be on that sidewall connecting to the major surface having the circuit path. The adjacent tiles are then interconnected by contact 35 that can be solder, a wire or ribbon as illustrated in, for instance, FIGS. 7 and 9.

The interconnection embodiment FIG. 11 is similar to FIG. 10 except that it does not include the metallization pads 33. The interconnection between adjacent tiles can be made by solder or wire contacts or metallization such as illustrated in FIGS. 4, 5a, 6 and 8.

In this disclosure there are shown and described only the preferred embodiments of the invention, but, as aforementioned, it is to be understood that the invention is capable of using various other combinations and environments and is capable of changes or modifications within the scope of the inventive concept as expressed herein.

What is claimed is:

1. A tiled liquid crystal flat panel display comprising a plurality of liquid crystal display tiles arranged substantially co-planer in a matrix and connected to a tile carrier; wherein each liquid crystal display tiles contain a top plate and a bottom plate located substantially parallel to each other, and circuit path located on at least one major external surface of each liquid crystal display tile, and metallization on at least one sidewall edge of said major external surface of each tile; and further comprising a ledge pad located on the top major surface of said bottom plate or on the bottom major surface of said top plate, and further comprises metallization on said ledge pad for electrically interconnecting each tile to an adjacent tile by electrical interconnection that bridges the gap between the metallization on the sidewall edge of adjacent liquid crystal display tiles, and wherein said top major surface and said bottom major surface comprise major internal surfaces of each liquid crystal display tile.

2. The liquid crystal display of claim 1 wherein said electrical interconnection comprises solder located on the metallization on the ledge pads of adjacent tiles.

3. A tiled liquid crystal flat panel display comprising a plurality of liquid crystal display tiles arranged substantially co-planer in a matrix and connected to a tile carrier; wherein each liquid crystal display tiles contain a top plate and a bottom plate located substantially parallel to each other, and circuit path located on at least one major external surface of each liquid crystal display tile, and metallization on at least one sidewall edge of said major external surface of each tile; and electrical interconnection located within the gap between the metallization on the sidewall edge of adjacent liquid crystal display tiles and bridging said gap for electrically interconnecting each tile to an adjacent tile.

4. The liquid crystal display of claim 3 wherein said electrical interconnection between adjacent tiles comprises a "U" shaped pre-formed spring.

5. The liquid crystal display of claim 4 wherein said "U" shaped pre-formed spring is coated on its outside with a precious metal.

6. The liquid crystal display of claim 4 wherein said precious metal is selected from the group consisting of platinum and palladium.

7. The liquid crystal display of claim 1 wherein the metallization on said sidewall edges and ledge pad is provided by a "L" shaped land.

8. The liquid crystal display of claim 7 wherein said "L" shaped land is a chrome/copper land.

9. The liquid crystal display of claim 7 wherein said "L" shaped land is chrome/gold or chrome/palladium land.

10. The liquid crystal display of claim 4 wherein said "U" shaped pre-formed spring is coated on its outside with a solder.

11. The liquid crystal display of claim 10 wherein the adjacent tiles also contain metallized pads on the said major external surface and containing wire bonding on said metallized pads.

12. The liquid crystal display of claim 11 wherein said metallized pads are chrome/aluminum, chrome/copper with gold or chrome/gold.

13. The liquid crystal display of claim 10 wherein said wire bonding is wedge bonded.

14. The liquid crystal display of claim 1 wherein said interconnection between adjacent tiles is provided by an electrically conductive adhesive.

15. The liquid crystal display of claim 11 wherein said wire bonding comprises wire or ribbon that extends in loop form into said gap between the metallization on the sidewall edge of adjacent liquid crystal display tiles.

16. The liquid crystal flat panel display of claim 3 wherein the top plate and bottom plate of each tile are dimensioned so as not to include a ledge pad on an interior major surface.

17. The liquid crystal flat panel display of claim 1 wherein said matrix is at least 2×3 tiles.

18. The liquid crystal flat panel display of claim 1 wherein said matrix is at least 3×3 tiles.

19. The liquid crystal flat panel display of claim 3 wherein said matrix is at least 2×3 tiles.

20. The liquid crystal flat panel display of claim 3 wherein said matrix is at least 3×3 tiles.

21. The liquid crystal display of claim 1 wherein the adjacent tiles also contain metallized pads on the said major external surface and containing wire bonding on said metallized pads.

* * * * *